United States Patent [19]

Yi et al.

[11] Patent Number: 5,792,417
[45] Date of Patent: Aug. 11, 1998

[54] METHOD OF MANUFACTURING ALUMINOBORATE GLASS-CERAMIC COMPOSITE

[75] Inventors: Hu Chun Yi, St. John's; Jacques Y. Guigne, Paradise, both of Canada; John J. Moore, Golden, Colo.

[73] Assignee: Cuigne International Ltd, Paradise, Canada

[21] Appl. No.: 814,611

[22] Filed: Mar. 10, 1997

[51] Int. Cl.$^6$ .......................... B29C 35/02; C03C 1/00; C03B 19/00

[52] U.S. Cl. .......................... 264/649; 65/17.4; 65/17.5; 264/80; 264/234; 501/32

[58] Field of Search .......................... 65/17.4, 17.5; 501/32; 264/80, 234, 649

[56] References Cited

U.S. PATENT DOCUMENTS

| | | | |
|---|---|---|---|
| 3,948,669 | 4/1976 | Brydges, III | 106/39.8 |
| 4,049,872 | 9/1977 | Hang | 428/427 |
| 4,861,734 | 8/1989 | MacDowell | 501/10 |
| 4,959,089 | 9/1990 | Bhargava | 65/33 |
| 5,340,448 | 8/1994 | Sekhar | 204/67 |
| 5,470,506 | 11/1995 | Tanigami | 252/518 |
| 5,672,435 | 9/1997 | Born et al. | 428/539.5 |

Primary Examiner—Christopher A. Fiorilla
Attorney, Agent, or Firm—Timothy T. Tyson; Freilich, Hornbaker & Rosen

[57] ABSTRACT

In-situ formation of glass-ceramic composites by the Self-propagating High temperature Synthesis (SHS) technique. The reagents used are: $TiO_2$, $B_2O$, Al, Ti, B and MO where MO represents BaO, MgO, CaO and other similar oxides. $BaCO_3$ may be substituted for BaO. The composition of the reaction products can be adjusted by adjusting the ratios of the reagents. All reagents are in powder form and the reaction can be carried out either in inert atmosphere inside a reaction chamber or in air without a chamber. The materials produced have crystalline $TiB_2$ particles in a glassy matrix (aluminoborate glass). The $TiB_2$ particles have a size of about 0.5 µm. Advantages include processing simplicity and cost savings. The glass-ceramic composites produced are electrically conductive and find application where high strength, hardness and electrical conductivity are required.

16 Claims, No Drawings

METHOD OF MANUFACTURING ALUMINOBORATE GLASS-CERAMIC COMPOSITE

BACKGROUND OF THE INVENTION

The present invention relates to the field of composites and more particularly to composites which are a mixture of $TiB_2$ particles in a glass matrix. This invention also relates to novel methods of manufacturing such composites.

Glass-ceramic materials exhibit superior mechanical properties to pure glasses. Generally, glass-ceramic materials are produced by melting the constituent oxides in a high temperature furnace for a long period of time, followed by casting and shaping the glass melts into desired shape. Then ceramic particles (crystals of complex oxides) are precipitated out by annealing the shaped articles at an elevated temperature. Such formed glass ceramics require extensive energy and prolonged time to produce.

The glass formation of the aluminoborates of Group II metal oxides was studied by Hirayama (Journal of the American Ceramic Society, vol.44, No.12(1961), pp. 602–606). It was shown that those glasses, particularly Group II-A aluminoborate, have a relatively large glass formation region. Those glasses have softening points in the range of 450°–600° C., and linear thermal expansion coefficients $4.7 \times 10^{-6}$ to $16 \times 10^{-6}$ per ° C. They also have relatively low Young's modulus. On the other hand, borides such as $TiB_2$ have high hardness, modulus and wear resistance. By combining the glass with the $TiB_2$ phase forming composite, it is expected that such glass-ceramics should exhibit superior mechanical properties.

This invention uses the Combustion Synthesis or Self-propagating High Temperature Synthesis (SHS) technique to produce the above-mentioned glass-ceramic composites. The SHS has the following advantages compared to the traditional route: (i) energy saving since no high temperature furnace is required; (ii) time saving since the typical combustion velocity is from a few millimeters to a few centimeters per second so that the whole process lasts a short period of time; (iii) relative high purity of a final product since high combustion temperature vaporizes most impurities; and (iv) simplicity of the whole process. Owing to these advantages, materials produced by the SHS have a lower overall cost compared to the conventional melting-casting route.

The SHS process can be realized by two modes, i.e., propagation (or combustion) mode and simultaneous (or thermal explosion) mode. In the propagation mode, the reactants are ignited by an external heat source. Once ignited, the highly exothermic reaction would ignite the next adjacent reactant layer by itself thereby generating a self-sustaining wave propagating toward the un-reacted part. In the simultaneous combustion mode, all reactants are heated uniformly until the combustion reaction is initiated simultaneously. A combustion reaction is defined by three parameters: ignition temperature which is the temperature at which the reaction rate becomes appreciable and self-sustaining; combustion temperature (Tc) which is the maximum temperature achieved; and combustion wave velocity which is the overall combustion rate. However, the state of green reactants, such as the particle size, green density, reaction environment etc., has a profound influence on combustion.

Although the SHS process has been used to produce many high temperature crystalline materials, as recorded in published articles (H. C. Yi and J. J. Moore, Journal of Material. Science, 1990, vol.25, pp. 1159–1168; Z. A. Munir and U. Anselmi-Tamburini, Material Science Reports, 1989, vol 3, pp. 277–265) and patents (U.S. Pat. Nos. 5,484,568 and 5,340,448 to J. A. Sekhar), this invention represents the first glass materials produced by the technique.

Development of a $TiB_2$ aluminoborate glass-ceramic composite and a low cost method of producing it represent great improvements in the field of composites and satisfy a long felt need of the composite engineer.

SUMMARY OF THE INVENTION

This invention uses a novel technique to produce new glass-ceramic composites with lower costs than the traditional melting-casting route. The new glass-ceramic composites find application where higher hardness and exceptional wear resistance are required. They also find application where a conductive glass is required.

The present invention uses powder reactants as raw materials. The powders used are: $TiO_2$, $B_2O$, Al, Ti, B and MO where MO represents BaO, MgO, CaO and other similar oxides. $BaCO_3$ may be substituted for BaO to reduce the cost, although both the Tc and wave velocity are decreased significantly. Also, $CO_2$ will be evolved during the combustion reaction.

The powders are weighed according to the desired composition of the final product and thoroughly mixed, by ball milling in air or by using acetone to form a slurry, then dried. Pellets with varied green densities (typically 30–70% theoretical) are pressed or packed from the mixed powders. The green pellets are then further heat treated to increase the rigidity, thus making handling easier. The final products are synthesized by igniting the heat treated pellets, thus establishing a self-sustaining combustion reaction until the whole pellet is reacted.

The materials produced by this invention have a glass matrix and a crystalline $TiB_2$ phase. Both the relative amount of the glass matrix in the composite and the composition of the glass matrix itself can be varied. The combustion reactions are either ignited by the propagation or by the simultaneous combustion mode. In the case of the propagation mode, pellets can be ignited at one end in an inert atmosphere inside a chamber or in air without a chamber, and self-sustaining combustion proceeds. The Tc is in the range of 1200°–1800° C. and wave velocities are in the range of 1–10 mm/sec depending on the conditions such as green density, particle size and compositions. In the case of the simultaneous combustion mode, pellets are heated inside a furnace previously heated to 700°–900° C. until combustion starts. Neither the Tc nor the wave velocity have been measured, but they should be higher than that experienced by the propagation mode.

X-ray diffraction (XRD) and Scanning Electron Microscopy (SEM) have confirmed that glass-ceramic composites were obtained. The $TiB_2$ phase (fine particulate form) having a typical size less than 0.5 µm, was the only crystalline phase dispersed in the glassy matrix. The size of the $TiB_2$ was dependent on the composition but generally was less than 1 µm in size.

Further shaping of the reacted composites can be readily done shortly after the completion of the combustion reaction, particularly when the samples are reacted in air. This includes densification of the material and drawing glass fibers from the melt shortly after the combustion reactions have completed.

An appreciation of the other aims and objectives of the present invention and an understanding of it may be achieved by referring to the following description of a preferred embodiment.

DETAILED DESCRIPTION OF THE PREFERRED EMBODIMENT

The present invention uses powder reactants as raw materials. Preferably, the reactants powders should have a particle size of less than 45 µm. The amounts of the different powders are determined by the desired composition of the end product. Material preparation involves the following steps.

(1) Weighing the reactant powders according to the following equation:

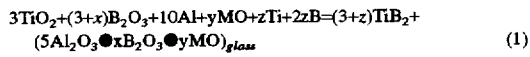

$$3TiO_2 + (3+x)B_2O_3 + 10Al + yMO + zTi + 2zB = (3+z)TiB_2 + (5Al_2O_3 \bullet xB_2O_3 \bullet yMO)_{glass} \quad (1)$$

where x, y, and z represent numbers and MO represents BaO, MgO, CaO or other similar oxides.

In the case of BaO, the reaction may also be conducted according to the following equation:

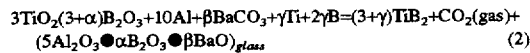

$$3TiO_2(3+\alpha)B_2O_3 + 10Al + \beta BaCO_3 + \gamma Ti + 2\gamma B = (3+\gamma)TiB_2 + CO_2(gas) + (5Al_2O_3 \bullet \alpha B_2O_3 \bullet \beta BaO)_{glass} \quad (2)$$

where α, β, and γ represent numbers.

In these self-sustaining combustion reactions, the heat generated from the reduction of the $TiO_2$ and $B_2O_3$ oxides by aluminum to form $Al_2O_3$ as well as from the formation of the $TiB_2$ phase is enough to melt the excessive oxides thereby forming a glass melt. The relative amount of oxides in the glass matrix is adjusted by the coefficients x and y while the amount of $TiB_2$ is adjusted by the z coefficient. The reaction (2) is less exothermic compared to (1) since decomposition of $BaCO_3$ consumes some of the heat. The final product consists of a glass matrix and crystalline $TiB_2$ particles. The composition range of the composite is listed in Table I.

TABLE I

| Compositions of glass-ceramic composites | |
|---|---|
| Glass matrix | Mol Percent |
| $B_2O_3$ | 10–60 |
| $Al_2O_3$ | 10–40 |
| BaO (or CaO, MgO, etc.) | 10–50 |
| $TiB_2$ | 10–100 |

(2) Mixing the reactant powders using ball milling, either dry in air or in an acetone slurry for at least 15 minutes.

(3) Pressing or packing the mixed powders into green pellets, uniaxially, into densities of 30–70% theoretical.

(4) Heat treating the green pellets at 500°–600° C. for 0.5–1.5 minutes to make the pellets rigid to allow easy handling.

(5) Igniting the pellets. Three methods can be used. a) resistance heating using a W coil in an inert atmosphere inside a reaction chamber; b) resistance heating using a Kanthal wire (or burning of a regular torch) in air without a chamber (propagation mode). c) placing the pellets into a furnace previously heated to about 700°–900° C. (simultaneous combustion or thermal explosion mode). Kanthal is a series of iron-chromium-aluminum electrical resistance alloys, available in wire, strip and other forms with a variety of maximum operating temperatures. Kanthal is a registered trademark of Kanthal AB, Sweden with offices in Bethel, Conn. The typical Tc for the propagation mode, is 1200°–1800° C. depending on compositions. The typical combustion wave velocity is 1–10 mm/sec.

(6) Shaping the reacted glass-ceramic sample into desired shape a few seconds after the samples have been withdrawn from the furnace and when the temperature has dropped to about 600°–700° C. In this step, the material can be shaped into desired shape. For instance, glass fibers can be drawn at this stage. Obviously, other shaping operation can be applied without difficulty since the material is processed in air without a reaction chamber.

Table 2 shows examples of mixtures of reactant powders that were mixed and reacted according to this invention. The compositions of the corresponding final products are shown in Table 3.

TABLE 2

| Batch Species | 1<br>x = 8<br>y = 7<br>z = 0 | 2<br>x = 10<br>y = 10<br>z = 0 | 3<br>x = 5<br>y = 2.5<br>z = 0 | 4<br>x = 40/3<br>y = 15<br>z = 0 | 5<br>x = 7.5<br>y = 12.5<br>z = 0 | 6<br>x = 15<br>y = 5<br>z = 0 | 7<br>x = 10<br>y = 5<br>z = 0 | 8<br>x = 20/3<br>y = 5<br>z = 0 | 9<br>x = 40/7<br>y = 25/7<br>z = 0 | 10<br>x = 5<br>y = 2.5<br>z = 0 | 11<br>x = 10<br>y = 10<br>z = 0 | 12<br>x = 10<br>y = 10<br>z = 0 | 13<br>α = 8<br>β = 7<br>γ = 0 | 14<br>x = 8<br>y = 7<br>z = 10 | 15<br>x = 8<br>y = 7<br>z = 20 |
|---|---|---|---|---|---|---|---|---|---|---|---|---|---|---|---|
| $TiO_2$ | 10.2 | 8.1 | 6.5 | 6.1 | 7.6 | 9.5 | 11.0 | 12.3 | 14.4 | 16.5 | 12.1 | 13.2 | 9.0 | 7.9 | 6.4 |
| $B_2O_3$ | 32.6 | 30.7 | 37.3 | 28.8 | 23.1 | 49.5 | 41.5 | 34.5 | 36.5 | 38.4 | 45.8 | 49.8 | 28.8 | 25.2 | 20.5 |
| Al | 11.5 | 9.2 | 7.4 | 6.8 | 8.6 | 10.7 | 12.4 | 13.8 | 16.2 | 18.6 | 13.7 | 14.8 | 10.2 | 8.7 | 7.2 |
| BaO | 45.7 | 52.0 | 48.8 | 58.3 | 60.7 | 30.3 | 35.1 | 39.4 | 32.9 | 26.5 | — | — | — | 35.3 | 28.7 |
| CaO | — | — | — | — | — | — | — | — | — | — | 28.4 | — | — | — | — |
| MgO | — | — | — | — | — | — | — | — | — | — | — | 22.2 | — | — | — |
| $BaCO_3$ | — | — | — | — | — | — | — | — | — | — | — | — | 52.0 | — | — |
| Ti | — | — | — | — | — | — | — | — | — | — | — | — | — | 15.7 | 25.6 |
| B | — | — | — | — | — | — | — | — | — | — | — | — | — | 7.1 | 11.6 |
| Tc, °C. | 1400 | 1300 | 1200 | 1200 | 1400 | 1200 | 1400 | 1400 | 1400 | 1500 | 1200 | 1300 | — | 1500 | 1700 |

TABLE 3

Composition of Final Glass Ceramic for Batches Shown in Table 2 (wt. %)

| Batch Species | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $Al_2O_3$ | 21.7 | 17.3 | 13.9 | 12.9 | 16.2 | 20.2 | 23.4 | 26.2 | 30.7 | 35.2 | 25.8 | 28.0 | 21.7 | 16.8 | 13.6 |
| $B_2O_3$ | 23.7 | 23.6 | 31.6 | 23.5 | 16.5 | 41.3 | 31.9 | 23.8 | 23.9 | 24.0 | 35.2 | 38.3 | 23.7 | 18.3 | 14.9 |
| BaO | 45.7 | 52.0 | 48.8 | 58.3 | 60.7 | 30.3 | 35.1 | 39.3 | 32.9 | 26.4 | — | — | 45.7 | 35.2 | 28.7 |
| CaO | — | — | — | — | — | — | — | — | — | — | 28.4 | — | — | — | — |
| MgO | — | — | — | — | — | — | — | — | — | — | — | 22.2 | — | — | — |
| $TiB_2$ | 8.9 | 7.1 | 5.7 | 5.3 | 6.6 | 8.2 | 9.6 | 10.7 | 12.5 | 14.4 | 10.6 | 11.5 | 8.9 | 29.7 | 42.8 |
| Glass matrix? | yes | yes | yes | yes | yes | yes | yes | yes | partial | partial | yes | yes | yes | yes | yes |

EXAMPLE 1

Reactant powders were mixed in proportions according to Batch 1 for at least 15 minutes using ball milling in air. Cylindrical pellets were then pressed uniaxially to a green density of 60±5% theoretical. The pellets were then ignited in a combustion chamber by resistance heating by a W coil under inert Argon atmosphere. Typical Tc was around 1400° C. and wave velocities were 1–3 mm/sec. The XRD on powders crushed from the reacted pellets showed the matrix was glassy while $TiB_2$ was the only crystalline phase. Measurements of the microstructure from a SEM image showed the $TiB_2$ particles had a size around 0.5 μm.

EXAMPLE 2

Pellets with 60±5% theoretical density pressed from Batch 1 were placed into a furnace preheated to about 700°–900° C. in air. The combustion reaction was initiated automatically after a few seconds. The XRD on the reacted sample confirmed complete reaction and formation of the glassy matrix and the $TiB_2$ crystalline phase. This technique (simultaneous combustion) proved to be valid to synthesize all of the batches listed in Table 2. The reacted melt was cast onto a steel plate, densified and shaped into a glass sheet. Fibers were also drawn from the melt by dipping a glass rod into the melt when it was cooled to temperature around 600°–700° C.

EXAMPLE 3

Reactant powders were mixed in proportions according to Batch 1 for at least 15 minutes using ball milling in air. Cylindrical pellets were then pressed uniaxially to a green density of 60±5% theoretical. The pellets were heat treated at 600° C. for 1 minute. After cooling down, the pellet was ignited at one end in air without a chamber by resistance heating with a Kanthal coil. Typical Tc was around 1200°–1400° C. and wave velocities were 2–3 mm/sec. XRD on powders crushed from the reacted pellets showed the matrix was glassy phases with $TiB_2$ as the only crystalline phase.

EXAMPLE 4

Reactant powders were mixed in proportions according to Batch 1 for at least 15 minutes using ball milling in air. Cylindrical pellets were obtained by lightly packing the reactant powders inside a cylinder made of paper resulting in a green density of 40±5% of theoretical. The pellets were then reacted either using method described in Example 2 or in Example 3. Typical Tc was around 1200°–1400° C. and wave velocities were 1–3 mm/sec. XRD on powders crushed from the reacted pellets showed the matrix was glassy with $TiB_2$ as the only crystalline phase.

EXAMPLE 5

Reactant powders were mixed in proportions according to Batch 2 for at least 15 minutes using ball milling in acetone. After evaporation of the acetone, cylindrical pellets were then pressed uniaxially to 60±5% theoretical density. They were then ignited either in a combustion chamber using a W coil under inert Argon atmosphere, or using the method shown in the Example 3 in air. Complete combustion was confirmed by XRD analysis on powders crushed from the reacted pellets.

EXAMPLE 6

Reactant powders were mixed in proportions according to Batches 3–7 for at least 15 minutes using ball milling. Cylindrical pellets were then pressed uniaxially to 60±5% theoretical density. They were then ignited in a combustion chamber by resistance heating using a W coil under inert Argon atmosphere. This took longer to ignite and the typical Tc was around 1200° C. XRD on powders crushed from the reacted pellets showed incomplete combustion for some samples. However, complete combustion was achieved using simultaneous combustion mode, i.e., the method described in Example 2.

EXAMPLE 7

Reactant powders were mixed in proportions according to Batches 8–10 for at least 15 min using ball milling. Cylindrical pellets were then pressed uniaxially to 60±5% theoretical density. They were then beat treated at 600° C. for 1 minute. After cooling, the pellets were ignited either in a combustion chamber by resistance heating using a W coil under inert Argon atmosphere, or in air without a chamber by resistance heating of a Kathal wire. The XRD on powders crushed from the reacted pellets showed that partial devitrification had occurred in samples processed from batches 9 and 10.

EXAMPLE 8

Reactant powders were mixed in proportions according to Batches 11–13 respectively for at least 15 minutes by ball milling and cylindrical pellets were then pressed from these batches uniaxially to 60±5% theoretical density. The pellets were then reacted by the simultaneous combustion mode, i.e. the method described in Example 3. The combustion reaction was initiated automatically after a few seconds. For the pellets from Batch 13, combustion wave velocities were much lower compared to the other compositions. Also, outgassing was observed, presumably caused by the formation of the $CO_2$ gas.

EXAMPLE 9

Reactant powders were mixed in proportions according to Batches 14 and 15 for at least 15 minutes by ball milling and cylindrical pellets were then pressed from the powders uniaxially to 60±5% theoretical density. Pellets were then ignited in an inert argon atmosphere inside a reaction chamber by resistance heating using a W coil. Typical Tc was 1500°–1800° C. and wave velocities were 5–7 mm/sec. XRD analysis confirmed formation of a glassy matrix and the $TiB_2$ phase.

The aluminoborate glass-$TiB_2$ ceramic composite has been described with reference to a particular embodiment. Other modifications and enhancements can be made without departing from the spirit and scope of the claims that follow.

What is claimed is:

1. A process of making a composite article comprising the steps of:
   a. providing powdered $TiO_2$, $B_2O_3$, Al, MO, Ti and B, where M represents an alkaline earth metal;
   b. weighing the powders in the following mole ratio: $3TiO_2$: $(3+x)B_2O_3$: 10Al:yMO:zTi:2zB, where x, y, and z represent numbers;
   c. mixing the powders for at least 15 minutes in a ball mill;
   d. forming the mixed powders into a green pellet uniaxially into densities of 30–70% theoretical;
   e. heat treating the green pellet at 500°–600° C. for 0.5–1.5 minutes;
   f. igniting the pellet, whereby a composite of (3+z)$TiB_2$ particles in a glass matrix having the formula $5Al_2O_3$●$B_2O_3$●yMO is produced; and
   g. shaping the composite article into desired shape when the temperature has dropped to about 600°–700° C.

2. A process of making a composite article as claimed in claim 1 in which the powders have a particle size of less than 45 µm.

3. A process of making a composite article as claimed in claim 1 in which mixing is conducted dry in air.

4. A process of making a composite article as claimed in claim 1 in which mixing is conducted in an acetone slurry.

5. A process of making a composite article as claimed in claim 1 in which ignition is performed by resistance heating a W coil in an inert atmosphere inside a reaction chamber.

6. A process of making a composite article as claimed in claim 1 in which ignition is performed by resistance heating a Kanthal wire in air.

7. A process of making a composite article as claimed in claim 1 in which ignition is performed by burning of a regular torch in air.

8. A process of making a composite article as claimed in claim 1 in which ignition is performed by placing the pellets into a furnace previously heated to about 700°–900° C.

9. A process of making a composite article comprising the steps of:
   a. providing powdered $TiO_2$, $B_2O_3$, Al, $BaCO_3$, Ti and B, where M represents an alkaline earth metal;
   b. weighing the powders in the following mole ratio: $3TiO_2$:$(3+\alpha)B_2O_3$: 10Al:$\beta$$BaCO_3$:$\gamma$Ti:2$\gamma$B where $\alpha$, $\beta$, and $\gamma$ represent numbers;
   c. mixing the powders for at least 15 minutes in a ball mill;
   d. forming the mixed powders into a green pellet uniaxially into densities of 30–70% theoretical;
   e. heat treating the green pellet at 500°–600° C. for 0.5–1.5 minutes;
   f. igniting the pellet, whereby a composite of (3+$\gamma$)$TiB_2$ particles in a glass matrix having the formula $5Al_2O_3$●$\alpha B_2O_3$●$\beta$BaO is produced and $CO_2$ gas is evolved; and
   g. shaping the composite article into desired shape when the temperature has dropped to about 600°–700° C.

10. A process of making a composite article as claimed in claim 9 in which the powders have a particle size of less than 45 µm.

11. A process of making a composite article as claimed in claim 9 in which mixing is conducted dry in air.

12. A process of making a composite article as claimed in claim 9 in which mixing is conducted in an acetone slurry.

13. A process of making a composite article as claimed in claim 9 in which ignition is performed by resistance heating a W coil in an inert atmosphere inside a reaction chamber.

14. A process of making a composite article as claimed in claim 9 in which ignition is performed by resistance heating a Kanthal wire in air.

15. A process of making a composite article as claimed in claim 9 in which ignition is performed by burning of a regular torch in air.

16. A process of making a composite article as claimed in claim 9 in which ignition is performed by placing the pellets into a furnace previously heated to about 700°–900° C.

* * * * *

UNITED STATES PATENT AND TRADEMARK OFFICE
CERTIFICATE OF CORRECTION

PATENT NO. : 5,792,417
DATED : August 11, 1998
INVENTOR(S) : Hu Chun Yi, Jacques Y. Guigne, John J. Moore It is certified that error appears in the above-identified patent and that said Letters Patent is hereby corrected as shown below:

On the title page, item [73] Assignee, "Cuigne" should read -- Guigne --.

Signed and Sealed this

Twelfth Day of October, 1999

Attest:

Q. TODD DICKINSON

*Attesting Officer*     *Acting Commissioner of Patents and Trademarks*